United States Patent [19]

Yeakey et al.

[11] Patent Number: 4,469,823

[45] Date of Patent: Sep. 4, 1984

[54] FLEXIBLE POLYURETHANE FOAMS MADE USING AN AROMATIC POLYESTER POLYOL

[75] Inventors: Ernest L. Yeakey; Robert L. Zimmerman; Michael E. Brennan, all of Austin, Tex.

[73] Assignee: Texaco Inc., White Plains, N.Y.

[21] Appl. No.: 518,171

[22] Filed: Jul. 28, 1983

[51] Int. Cl.³ .............................................. C08G 18/14
[52] U.S. Cl. ...................................... 521/172; 521/173
[58] Field of Search ................................. 521/172, 173

[56] References Cited

U.S. PATENT DOCUMENTS

| | | | |
|---|---|---|---|
| 3,079,350 | 2/1963 | Bernstein | 521/116 |
| 3,344,091 | 9/1967 | Russin et al. | 526/71 |
| 3,647,759 | 3/1972 | Walker | 521/172 |
| 3,755,212 | 8/1973 | Dunlap et al. | 521/172 |
| 3,892,796 | 7/1975 | Leibfried | 260/468 K |
| 4,048,104 | 9/1977 | Svoboda et al. | 521/159 |
| 4,186,257 | 1/1980 | Blahak et al. | 521/159 |
| 4,223,068 | 9/1980 | Carlstrom et al. | 521/131 |
| 4,233,408 | 11/1980 | Satterly et al. | 521/172 |
| 4,237,238 | 12/1980 | DeGuiseppi et al. | 521/131 |
| 4,246,365 | 1/1981 | Wiedermann et al. | 521/172 |

*Primary Examiner*—Maurice J. Welsh
*Attorney, Agent, or Firm*—Jack H. Park; Kenneth R. Priem; David L. Mossman

[57] ABSTRACT

A method for producing a flexible polyurethane foam from reacting a polyol blend with a polyisocyanate in the presence of a polyurethane formation catalyst is described. The polyol blend contains from 0.5 to 10 wt. % of an aromatic polyester polyol extender typically used in rigid foams. The polyol extender is made from dibasic acids, alkylene glycols and recycled polyethylene terephthalate. Commercial extenders cause flexible foams to shrink, a problem not found in the foams of this invention.

10 Claims, No Drawings

FLEXIBLE POLYURETHANE FOAMS MADE USING AN AROMATIC POLYESTER POLYOL

CROSS-REFERENCE TO RELATED APPLICATION

U.S. patent application Ser. No. 443,778 filed on Nov. 22, 1982, now reveals U.S. Pat. No. 4,438,550 aromatic polyols used in the novel polyol blend herein which polyols may be made from recycled polyethylene terephthalate, and alkylene glycol and dibasic acid waste streams.

BACKGROUND OF THE INVENTION

1. Field of the Invention

The invention relates to polyol blends to be used in flexible polyurethane foams and more particularly relates to such blends and foams which use an aromatic polyester polyol made from recycled polyethylene terephthalate and alkylene glycol and dibasic acid waste streams.

2. Description of Relevant Compounds and Methods in the Field

Flexible polyurethane foams are widely used as cushioning materials in furniture and automotive seating, mattresses and the like. They are made generally like other types of foams; that is, a polyol is reacted with a polyisocyanate in the presence of a polyurethane-forming catalyst such as a tertiary amine or an organotin compound. Frequently, other materials are added such as silicone surfactants, fire retardants, blowing agents, etc. U.S. patents which are concerned with flexible polyurethane foams include U.S. Pat. Nos. 3,535,307; 3,847,992; 4,316,991; 4,338,408 and 4,342,687, among others.

The recovery of polyalkylene terephthalate scrap or residues has long been practiced. U.S. Pat. No 3,344,091 describes a process for converting scrap polyester, such as polyethylene terephthalate (PET) into active prepolymer particles by mixing the scrap PET with the glycol originally used in preparing PET, with or without the additional presence of a lower dialkyl ester of the aromatic dicarboxylic acid whose dehydroxylated residues are present in the scrap PET. Chemical Abstracts (CA), vol. 84, paragraph 5638h, relates that British Pat. No. 1,458,486 teaches dialkyl terephthalates, such as dimethyl terephthalate (DMT), recovery by heating scrap PET with monohydric alcohols with a catalyst and a sequestering agent.

PET scrap may be recovered by depolymerization with glycols as seen in CA 78:160452n, abstract to East German Pat. No. 92,801. U.S. Pat. No. 4,166,896 teaches that a mixture of glycols and oligomers (such as low molecular weight polyesters of terephthalic acid and a glycol) may be depolymerized (transesterified) by heating. Subsequently, ethylenically unsaturated dicarboxylic acids or their anhydrides are added and the mixture is heated again. An unsaturated polyester resin is produced. A suitable dicarboxylic acid is phthalic acid, the anhydride of which is also useful in this process.

Scrap polyalkylene terephthalate, such as polyethylene terephthalate is known to be incorporated into polyurethanes. For example, U.S. Pat. No. 4,048,104 relates that polyisocyanate prepolymers for use in polyurethane products may be prepared by combining an organic polyisocyanate with polyols which are the hydroxyl-terminated digestion products of waste polyalkylene terephthalate polymers and organic polyols. A polyol ingredient which is the digestion product of polyalkylene terephthalate residues or scraps digested with organic polyols is also described in U.S. Pat. No. 4,223,068. Another case where terephthalic acid residues are employed is outlined in U.S. Pat. No. 4,246,365 where polyurethanes are made from polyesters containing at least two hydroxyl groups and terephthalic acid residues.

More relevant to the compounds of this invention is the solution proposed in U.S. Pat. No. 4,237,238. In this patent, a polyol mixture is prepared by the transesterification of a residue from the manufacture of dimethyl terephthalate with a glycol, which is then used to produce polyisocyanurate foams having a combination of a higher degree of fire resistance with low smoke evolution, low foam friability and high compressive strength. The preparation of such a polyol mixture (from ethylene glycol and dimethyl terephthalate esterified oxidate residue) is described in U.S. Pat. No. 3,647,759. J. M. Hughes and John Clinton, in the Proceedings of the S.P.I. 25th Annual Urethane Division Technical Conference, Scottsdale, Ariz. (October 1979), describe other foams prepared from the polyols of U.S. Pat. No. 3,647,759.

U.S. Pat. No. 3,755,212 teaches air blown polyurethane foams prepared from ester-modified polyether polyols, a polyisocyanate and a polyurethane catalyst. The modifying agents for reaction with the polyols apparently are internal anhydrides of polycarboxylic acids, such as phthalic anhydride. Rigid polyurethane foams may be made from a fluid polyol made by hydrogenating a DMT process residue, then reacting the hydrogenation product with an alcoholic material, according to U.S. Pat. No. 3,892,796. Further, U.S. Pat. No. 4,186,257 reveals that high molecular weight polyurethanes from polyols linked with ester groups may be made by reacting diols with phthalic acid or DMT. Polybutylene terephthalate diols and polyhexamethylene terephthalate diols are also used.

Brominated ester-containing polyether polyols may be prepared by the sequential reaction of a polyether polyol with 4,5-dibromohexahydrophthalic anhydride and an alkylene oxide according to U.S. Pat. No. 4,069,207. Flame-retardant polyurethane foams are prepared using these modified polyols. Also relevant is East German Pat. No. 122,986 cited in CA 86:190834w which teaches that polyurethanes may be manufactured from polyester polyols made by condensation and transesterification of PET synthesis distillation residues with polyols, polyamino alcohols and fatty acid ester diols.

SUMMARY OF THE INVENTION

The invention concerns a method for making non-shrinking flexible polyurethane foam by reacting in the presence of a polyurethane catalyst an organic polyisocyanate and a polyol blend having an average hydroxyl number in the range from about 25 to 100. From about 90 to 99.5 wt.% of the blend is a polyether polyol having a hydroxyl number in the range from 25 to 60 and a molecular weight in the range from 2,000 to 6,000. The balance of the blend, from 0.5 to 10 wt.%, is an aromatic polyester polyol having a hydroxyl number of from 50 to 250 and is made by esterifying, in the absence of a catalyst, a dibasic acid waste stream with an alkylene glycol, the reaction product of which is transesterified with recycled polyethylene terephthalate.

DETAILED DESCRIPTION OF THE PREFERRED EMBODIMENTS

Typically, a single polyol is used to react with the polyisocyanate to give a flexible polyurethane foam. However, in this invention a blend of polyols is found to be useful. Instead of using a single polyol, which may be expensive, part of the blend is made up of polyols made from residues and scraps. This partial replacement of expensive polyols with inexpensive polyols makes the foams of this invention more economical. Surprisingly, good foams are obtained even though some cheaper polyols are employed. The polyol extenders used herein do not cause the foams to shrink as do some commercial polyol extenders.

The aromatic polyester polyol extender mixtures are made by using a recycled polyethylene terephthalate (PET). This may be any scrap residue from old polyethylene terephthalate which contains compounds which have the moiety

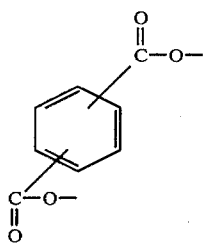

Generally, the scrap or recycled polyethylene terephthalate may be in any particulate form. A frequently seen form is fragmentized soft drink bottles which appear as clear or colored chips. Polyethylene terephthalate film can also be recycled. Any chopping or pulverizing process which produces small bits of solid PET from the larger, waste recycled articles would be appropriate to produce scrap PET useful herein. Sometimes the scrap PET is mixed with a solvent to make a kind of slurry. While scrap PET slurry could be used in making these polyols, the recycled PET chips without the solvent is also useful.

The polyester polyol with which the polyethylene terephthalate scrap is reacted is produced by the esterification of a residue of dibasic acid manufacture, as noted before. Dibasic acids are those acids which have two displaceable hydrogen atoms. Examples of such acids are succinic, glutaric and adipic acid. Especially preferred are the residues from adipic acid manufacture which contain portions of each of the three acids listed above. It is necessary that the acids be dibasic so that polymer chains can be formed upon reaction with the glycol. These materials may also include waste dicarboxylic acids.

Preferably, the alkylene glycol has the formula

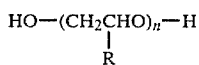

where R is hydrogen or lower alkyl of one to four carbon atoms and n is from 1 to 3. Glycols which meet this definition are ethylene glycol, propylene glycol (1,2-propylene glycol), diethylene glycol (DEG), dipropylene glycol, and triethylene glycol (TEG), among others. The glycol may be a residue or flash-separated glycol.

The polyester polyol which results from the reaction of the dibasic acid residue and an alkylene glycol, such as diethylene glycol, may be a diester diol. Such a diol may be defined by the formula

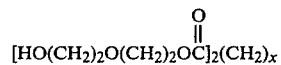

where x is 2 to 4.

The proportions of the reactants should be such as to give a resulting mixture or aromatic polyester polyols which have an average OH (hydroxyl) number within the desired range of about 100 to 400. The saponification number of the scrap polyethylene terephthalate (a measure of transesterification sites) should be considered in selecting proportions, if obtainable. One PET unit has a molecular weight of 192.2. Preferably the approximate mole ratio of scrap polyethylene terephthalate to dibasic acid to alkylene glycol may be about 1:1:2. These proportions could vary 5% in either direction. What actually forms the "polyol" is a mixture of polyols having ester functions, even though the mixture is sometimes a singular "polyol".

Generally, both reactions need heat between ambient and about 300° C. to proceed. Preferably, the temperature for both steps should be between 140° and 220° C. Unlike some prior art processes, both steps are non-catalytic. The pressure can be atmospheric, subatmospheric or autogenous. The polyol should have a hydroxyl number in the range of 50 to 400, with an especially preferred hydroxyl number range of 50 to 250.

The approximate structure of one of these aromatic polyester polyols sold by Texaco Chemical Company as THANOL®R-510 has been identified as follows:

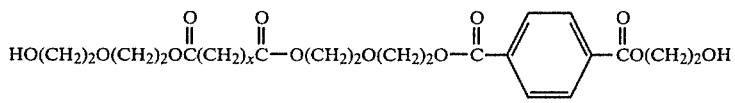

where x is an integer of from 2 to 4. The mixture that results from the process described has an average value of x of around 3. Examples of preparation of these types of polyols are given in U.S. patent application Ser. No. 443,778 filed Nov. 22, 1983. The hydroxyl number of THANOL R-510 is in the range between 210 and 230.

Only about 0.5 to 10 wt.% of the polyol component should be the aromatic polyester polyols described above. The balance of the polyol component, from 90 to 99.5 wt.%, is a more typical polyester or polyether polyol commonly used in flexible foams. The average hydroxyl number of the resulting blend should be between 25 and 100.

The balance of the polyol component which reacts with the isocyanate may suitably be a polyester polyol or a polyether polyol. When it is desired to provide a flexible foam, the hydroxyl number is preferably in the range from about 25 to 60.

Also, for a flexible urethane foam the polyol should preferably have an average functionality of from about 2 to about 4 and a molecular weight of from about 2,000 to about 6,000.

When the polyol is a polyester, it is preferable to use as the polyester, a resin having a relatively high hydroxyl value and a relatively low acid value made from the reaction of a polycarboxylic acid with a polyhydric alcohol. The acid component of the polyester is preferably of the dibasic or polybasic type and is usually free of reactive unsaturation, such as ethylenic groups or acetylenic groups. The unsaturation, such as occurs in the rings of such aromatic acids as phthalic acid, terephthalic acid, isophthalic acid, or the like, is non-ethylenic and non-reactive. Thus, aromatic acids may be employed for the acid component. Aliphatic acids, such as succinic acid, adipic acid, sebacic acid, azelaic acid, etc. may also be employed and are preferred. The alcohol component for the polyester should preferably contain a plurality of hydroxyl groups and is preferably an aliphatic alcohol, such as ethylene glycol, glycerol, pentaerythritol, trimethylolethane, trimethylolpropane, mannitol, sorbitol, or methyl glucoside. Mixtures of two or more of the above identified alcohols may be employed also if desired.

When the hydroxyl-containing component is a polyether polyol for use in flexible polyurethane foam, the polyol may be an alkylene oxide adduct of a polyhydric alcohol with a functionality of from about 2 to about 4. The alkylene oxide may suitably be ethylene oxide, propylene oxide, or 1,2-butylene oxide, or a mixture of some or all of these. The polyol will suitably have a molecular weight within the range of from about 2,000 to about 7,000. For flexible polyether polyurethane foams, the alkylene oxide is preferably propylene oxide or a mixture of propylene oxide and ethylene oxide.

A wide variety of aromatic polyisocyanates may be employed. Typical aromatic polyisocyanates include m-phenylene diisocyanate, p-phenylene diisocyanate, polymethylene polyphenylisocyanate, 2,4-toluene diisocyanate, 2,6-toluene diisocyanate, dianisidine diisocyanate, bitolylene diisocyanate, naphthalene-1,4-diisocyanate, xylylene-1,4-diisocyanate, xylylene-1,3-diisocyanate, bis(4-isocyanatophenyl)methane, bis(3-methyl-4-isocyanatophenyl)methane, bis(3-methyl-4-isocyanatophenyl)methane, and 4,4'-diphenylpropane diisocyanate.

Greatly preferred aromatic polyisocyanates used in the practice of the invention are 2,4- and 2,6-toluene diisocyanates and methylene-bridged polyphenyl polyisocyanate mixtures which have a functionality of from about 2 to 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Most preferred methylene-bridged polyphenyl polyisocyanate mixtures used here contain about 20 to about 100 weight percent methylene diphenyldiisocyanate isomers, with the remainder being polymethylene polyphenyl polyisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

The amount of polyol component to be used relative to the isocyanate compound in both polyester and polyether foams normally should be such that the isocyanate groups are present in at least an equivalent amount, and preferably, in slight excess, compared with the free hydroxyl groups. Preferably, the ingredients will be proportioned so as to provide from about 0.9 to about 1.5 mole equivalents of isocyanate groups per mole equivalent of hydroxyl groups.

It is within the scope of the present invention to utilize an extraneously added inert blowing agent such as a gas or gas-producing material. For example, halogenated low-boiling hydrocarbons, such as trichloromonofluoromethane and methylene chloride, carbon dioxide, nitrogen, etc. may be used. The inert blowing agent reduces the amount of excess isocyanate and water that is required in preparing flexible urethane foam. For a rigid foam, the use of water is often avoided and the extraneous blowing agent is used exclusively. Selection of the proper blowing agent is well within the knowledge of those skilled in the art. See for example U.S. Pat. No. 3,072,082.

Typically, the polyurethane catalysts are employed in an amount of from about 0.05 to about 4.0 weight percent based on the combined weight of the polyol component and polyisocyanate. More often, the amount of catalyst used is 0.1-2.0 weight percent.

Common polyurethane catalysts are organic tin compounds and tertiary amines. The organic tin compound, particularly useful in making flexible foams may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Such tertiary amines include trialkylamines (e.g., trimethylamine, triethylamine), heterocyclic amines, such as N-alkylmorpholines (e.g., N-methylmorpholine, N-ethylmorpholine, etc.), 1,4-dimethylpiperazine, triethylenediamine, etc., and aliphatic polyamines, such as N,N,N'N'-tetramethyl-1,3-butanediamine.

Conventional formulation ingredients are also employed, such as, for example, foam stabilizers, also known as silicone oils or emulsifiers. The foam stabilizer may be an organic silane or siloxane. For example, compounds may be used having the formula:

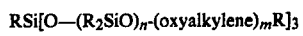

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

In preparing a flexible foam, the ingredients may be simultaneously, intimately mixed with each other by the so-called "one-shot" method to provide a foam by a one-step process. In this instance, water should comprise at least a part (e.g. 10% to 100%) of the blowing agent. The foregoing methods are known to those skilled in the art, as evidenced by the following publication: duPont Foam Bulletin, "Evaluation of Some Polyols in One-Shot Resilient Foams", Mar. 22, 1960.

The invention will be illustrated further with respect to the following specific examples, which are given by way of illustration and not as limitations on the scope of this invention.

EXAMPLES 1-4

The following examples illustrate the use of these polyols as extender polyols in flexible urethane foam.

|  | A | B | C | D |
|---|---|---|---|---|
| THANOL F-3016[1] | 100 | 100 | 100 | 100 |
| Sil-wet L-711[2] | 1.0 | 1.0 | 1.0 | 1.0 |
| Water | 4.0 | 4.0 | 4.0 | 4.0 |
| Stannous octoate | 0.33 | 0.33 | 0.33 | 0.33 |
| THANCAT ® TD-33[3] | 0.28 | 0.28 | 0.28 | 0.15 |
| THANOL R-510[4] | — | 5.0 | — | — |
| TERATE ® 203[5] | — | — | 5.0 | — |
| Polyol A[6] | — | — | — | 5.0 |
| Toluene diisocyanate | 52 | 53.7 | 54.9 | 52.9 |
| Cream time (sec) | 9 | 9 | 11 | 15 |
| Rise time (sec) | 73 | 67 | 105 | 131 |
| Physical Properties |  |  |  |  |
| Density (pcf) | 1.58 | 1.55 | — | 1.63 |
| Tensile (psi) | 162 | 160 | — | — |
| Ultimate elongation, % | 148 | 145 | — | — |
| Tear resistance (pli) | 1.05 | 2.16 | — | — |
| Ball rebound, % | 40 | 36 | — | — |

A - No shrinkage
B - No shrinkage
C - Severe shrinkage
D - No shrinkage
[1]A 3000 molecular weight polyol having a hydroxyl number of 56 made by Texaco Chemical Co.
[2]A silicone surfactant made by Union Carbide Chemical Corp.
[3]A 33 wt. % solution of triethylenediamine in propylene glycol made by Texaco Chemical Co.
[4]Aromatic polyester polyol of a structure defined previously herein made by Texaco Chemical Co.
[5]Commercial polyol extender that is a dimethyl terephthalate resin modified with a glycol, sold by Hercules, Inc.
[6]Polyol A was prepared by reacting a polyester made from diethylene glycol and a mixture of adipic, glutaric and succinic acids (hydroxyl number 274) with polyethylene terephthalate. The final polyol had a hydroxyl number of 87.

It may be seen from Examples 1 through 4 that while the commercial polyol extender TERATE 203 gives a flexible foam that shrinks severely (Foam C), the use of THANOL R-510 (Foam B) and a similarly characterized aromatic polyester polyol (Foam D) successfully were added to THANOL F-3016 without causing shrinkage or other adverse effects.

Many modifications may be made in the method of this invention without departing from the spirit and scope thereof which are defined only by the appended claims. For example, the combination of particular polyols and proportions thereof may be modified to provide a flexible foam with optimal properties.

We claim:

1. A method for producing a flexible polyurethane foam comprising reacting in the presence of a polyurethane catalyst an organic polyisocyanate and a polyol blend having an average hydroxyl number in the range from about 25 to 100 where the polyol blend comprises
   a. from about 90 to 99.5 wt.% of a polyester polyol or polyether polyol and
   b. from about 0.5 to 10 wt.% of an aromatic polyester polyol which is the reaction product from
      (1) esterifying, in the absence of a catalyst, a residue from dibasic acid manufacture with an alkylene glycol to produce a polyester polyol intermediate, and
      (2) transesterifying, in the absence of a catalyst, recycled polyethylene terephthalate with the polyester polyol intermediate of the previous step.

2. The method of claim 1 in which the aromatic polyester polyol has a structure of the following formula

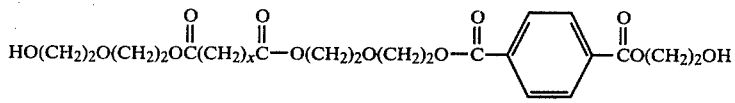

where x is an integer of from 2 to 4.

3. The method of claim 1 in which the catalyst is a tertiary amine compound and the polyisocyanate is an aromatic diisocyanate.

4. A method for producing a non-shrinking flexible polyurethane foam comprising reacting in the presence of a polyurethane catalyst an organic polyisocyanate and a polyol blend having an average hydroxyl number in the range from about 25 to 100 where the polyol blend comprises
   a. from about 90 to 99.5 wt.% of a polyester polyol or a polyether polyol having a hydroxyl number in the range from 25 to 60 and a molecular weight in the range from 2,000 to 6,000, and
   b. from about 0.5 to 10 wt.% of an aromatic polyester polyol having a hydroxyl number of from 50 to 250 which is the reaction product from
      (1) esterifying, in the absence of a catalyst, a residue from dibasic acid manufacture with an alkylene glycol to produce a polyester polyol intermediate, and
      (2) transesterifying, in the absence of a catalyst, recycled polyethylene terephthalate with the polyester polyol intermediate of the previous step.

5. The method of claim 4 in which the aromatic polyester polyol has a structure of the following formula

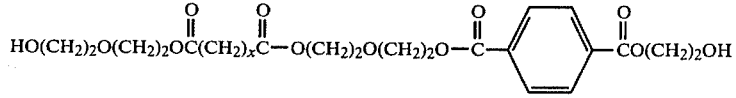

where x is an integer of from 2 to 4.

6. The method of claim 4 in which the catalyst is a tertiary amine compound and the polyisocyanate is an aromatic diisocyanate.

7. A flexible polyurethane foam made by the process comprising reacting in the presence of a polyurethane catalyst an organic polyisocyanate and a polyol blend having an average hydroxyl number in the range from about 25 to 100 where the polyol blend comprises
a. from about 90 to 99.5 wt.% of a polyester polyol or polyether polyol and
b. from about 0.5 to 10 wt.% of an aromatic polyester polyol which is the reaction product from (1) esterifying, in the absence of a catalyst, a residue from dibasic acid manufacture which comprises one or more acids from the group consisting of glutaric acid, succinic acid and adipic acid, with an alkylene glycol to produce a polyester polyol intermediate, and (2) transesterifying, in the absence of a catalyst, recycled polyethylene terephthalate with the polyester polyol intermediate of the previous step.

8. The foam of claim 7 in which the polyether polyol has a hydroxyl number in the range from 25 to 60 and a molecular weight in the range from 2,000 to 6,000 and the aromatic polyester polyol has a hydroxyl number in the range from 50 to 250.

9. The foam of claim 7 in which the aromatic polyester polyol has a structure of the following formula

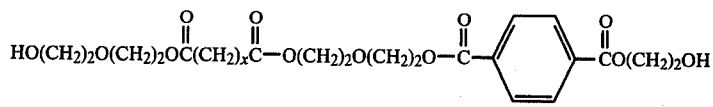

where x is an integer of from 2 to 4.

10. The foam of claim 7 in which the catalyst is a tertiary amine compound and the polyisocyanate is an aromatic diisocyanate.

* * * * *